United States Patent Office.

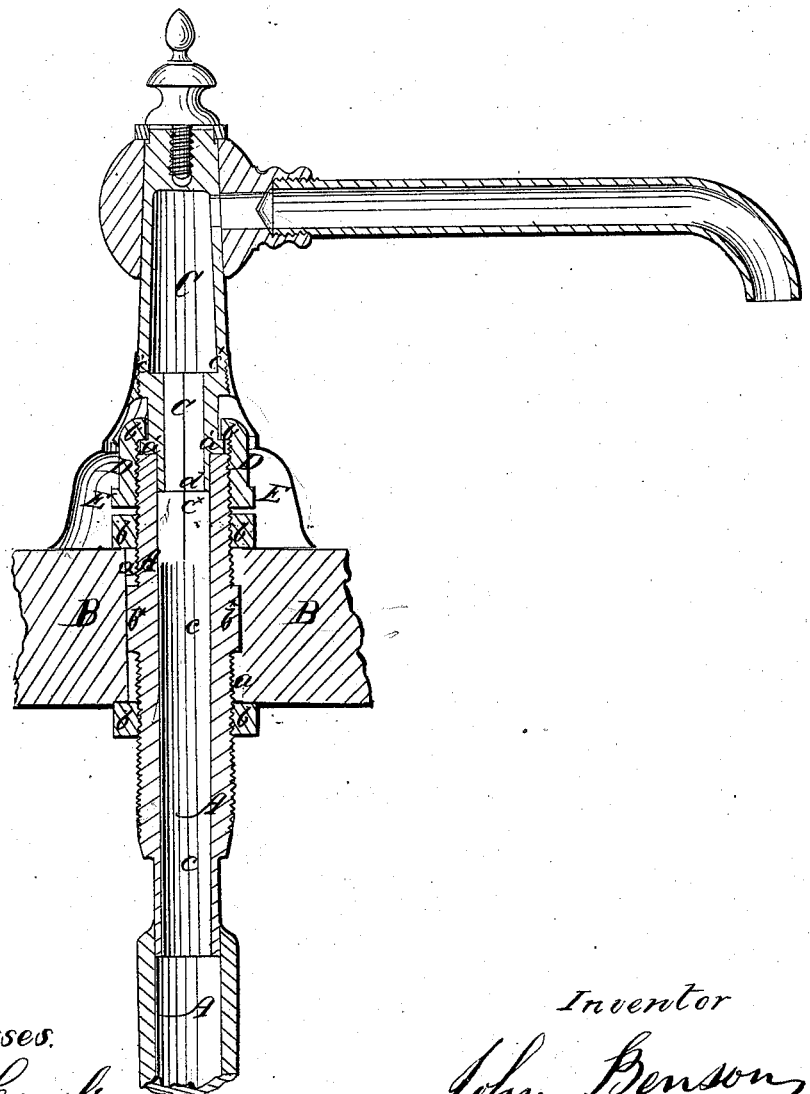

JOHN BENSON, OF YONKERS, NEW YORK.

Letters Patent No. 79,190, dated June 23, 1868.

---

IMPROVEMENT IN BASIN-FAUCETS.

---

The Schedule referred to in these Letters Patent and making part of the same.

---

TO ALL WHOM IT MAY CONCERN:

Be it known that I, JOHN BENSON, of Yonkers, in the county of Westchester, and State of New York, have invented certain new and useful Improvements in Couplings for Basin-Cocks; and I do hereby declare that the following is a full, clear, and exact description of the same, reference being had to the accompanying drawing, making a portion of this specification, which is a vertical section, showing a basin-cock coupling constructed according to my invention.

This invention consists in a coupling-tube extended upward through the basin-slab, so combined with the stock of the cock and suitable locking-nut, that the coupling or connection of the cock with its water-pipe may be readily reached for the purpose of being repaired, or for the removal of obstructions, without involving the necessity of first taking away the basin-slab, and that any water that may escape from the coupling by leakage may be caught upon the basin-slab, thereby preventing the injury that would otherwise result from such leakage; the coupling being thus rendered far superior to those situated underneath the basin-slab in the ordinary manner, and which are not only difficult of access, but which, when leaky, often occasion considerable damage by the outflow of water before the leak can be ascertained and repaired.

The invention further consists in a shell, so arranged upon the basin-slab, and in relation with the other parts just mentioned, as to effectually conceal the coupling itself, and insure a sightly and symmetrical appearance to the device.

To enable others to understand the nature and construction of my invention, I will proceed to describe it with reference to the drawing.

A represents the coupling-tube, to the lower end of which is soldered or otherwise attached the water-pipe A*, and which passes up through a hole, $a$, formed in the basin-slab B, such hole being preferably of rectangular form, so that the coupling-tube may be prevented, by a square portion, $b^*$, formed centrally thereon, from turning in such hole.

Each end portion of the coupling-tube has a screw-thread formed upon it, and has screwed thereon a suitable nut, $b$. The nuts $b$ being situated one above and the other below the slab B, are tightened against the latter, and thus firmly secure the coupling-tube in the slab, with its upper portion extending up above the same, as shown in the drawing.

The upper portion $c^*$ of the bore $c$ of the coupling-tube is made square, and has fitted into it a downwardly-extending lip, $d$, of corresponding shape, provided upon the lower end of the stock C of the cock, which latter may be of any suitable variety. Formed upon the stock C, above the lip $d$, is an annular flanch, $a'$, which rests upon the upper end of the coupling-tube, and which has fitted above it the inwardly-extending flange $b'$ of a locking-nut, D, which is screwed upon the upper portion of the coupling-tube, and thus firmly locks or holds the stock C of the cock down upon and in connection with the coupling-tube A, thereby coupling or connecting the cock with the water-pipe A*, attached to the coupling-tube.

E represents a metallic shell, which may be of nearly conical or other suitable form, and which is placed around the nut D, and the adjacent portions of the coupling-tube and the stock, with its base or lower end upon the basin-slab, the contracted upper end of the shell being fitted to the stock preferably by being screwed thereon, as indicated at $e$.

Inasmuch as the cock is connected with the coupling-stock, or, in other words, with the water-pipe A*, attached to such stock at a point above the slab, the several parts of the coupling may be very conveniently reached, either to repair a leak or for any other purpose, without removing such slab as is required, when the coupling is formed underneath the same in the ordinary manner; and not only this, but as any water, which may leak from the coupling, will be caught upon the slab, it follows that no material damage, which would almost inevitably result if the coupling were below the slab, can be caused thereby. The shell E, by concealing the several parts of the coupling, insures a symmetrical appearance to the exterior of the device.

What I claim as my invention, and desire to secure by Letters Patent, is—

1. The combination of the coupling-tube A, having nuts $b$ above and below the slab, with the stock C of the cock, and locking-nut D, all arranged and operating substantially as shown and described.

2. In combination with the above, I claim the cap or shell E attached to the stock C, and enclosing the coupling-joints, substantially as shown and described.

JOHN BENSON.

Witnesses:
A. LE CLERC,
J. W. COOMBS.